Aug. 1, 1967 F. H. BLAKE 3,334,285
MOTOR SPEED CONTROL FOR SUPPLY SYSTEM
Filed May 3, 1965 3 Sheets-Sheet 1

INVENTOR.
FREDERICK H. BLAKE
BY
Schapp & Hatch

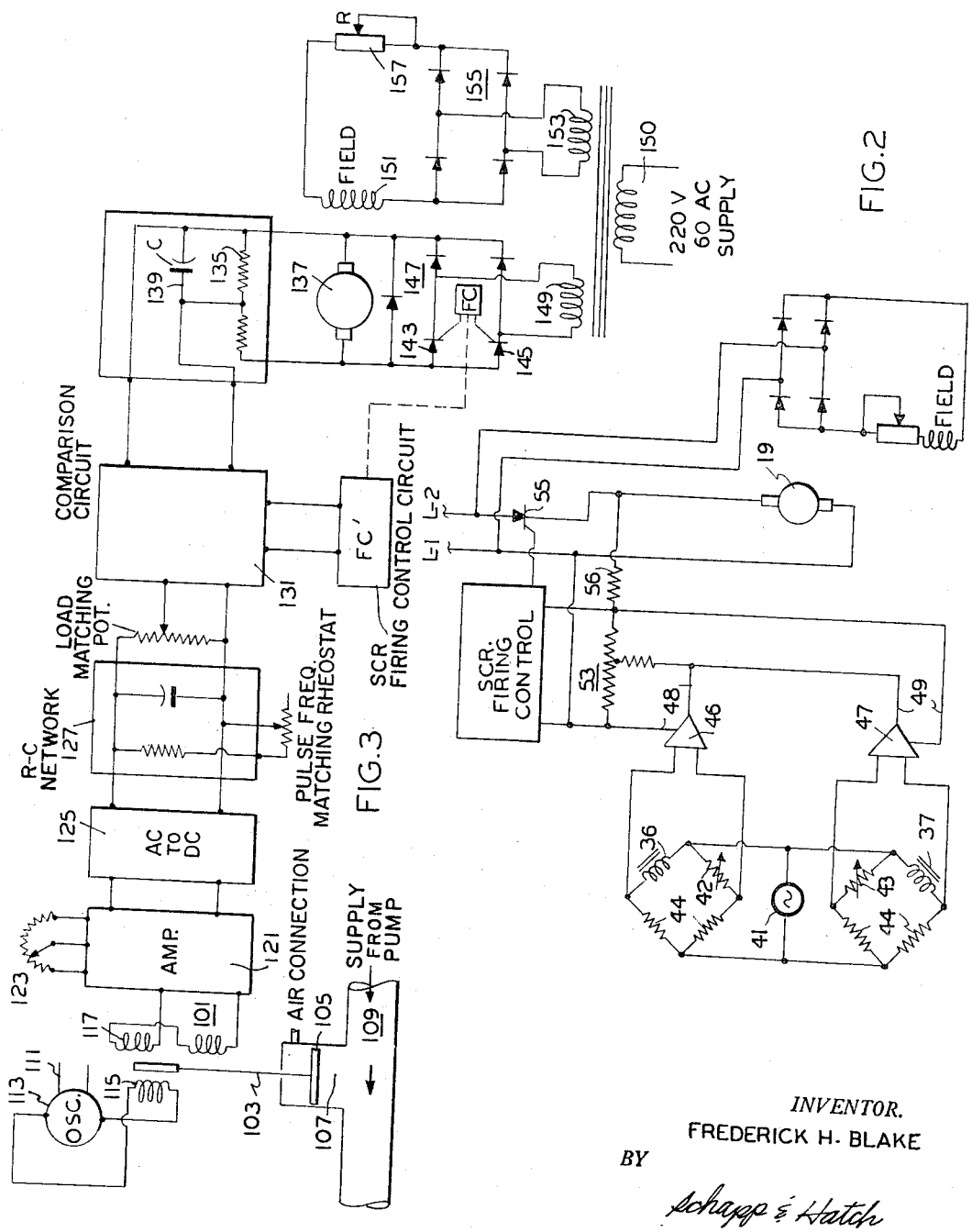

Aug. 1, 1967

F. H. BLAKE 3,334,285

MOTOR SPEED CONTROL FOR SUPPLY SYSTEM

Filed May 3, 1965

INVENTOR.
FREDERICK H. BLAKE
BY
Schapp & Hatch
ATTORNEYS

United States Patent Office 3,334,285
Patented Aug. 1, 1967

3,334,285
MOTOR SPEED CONTROL FOR SUPPLY SYSTEM
Frederick H. Blake, 841 Carnation Court,
Los Altos, Calif. 94022
Filed May 3, 1965, Ser. No. 452,548
5 Claims. (Cl. 318—331)

This application is a continuation-in-part of my earlier filed copending application Ser. No. 267,498 entitled, "Supply System," filed Mar. 25, 1963, and now abandoned.

The present invention relates to improvements in a supply system, and more particularly to an improved supply system for providing an intermittent supply of flowable material from a continuous supply thereof which maintains the material at a controllable constant pressure.

In many industrial operations, it is required to provide quantities of material intermittently in regular pulses. This is particularly true where it is desired to provide shaped articles in a mold or the like which has a filling period and a material removal period. In such a case the supply system to the mold is usually required to provide material to fill the mold intermittently under accurately controlled conditions, and control of such intermittent supply has created a difficult problem.

The problem has been particularly acute where it is necessary or highly desirable to fill the mold at a controlled constant pressure with compactible material such as plastic food products. Although certain systems have been developed for handling these problems, the most accurate machines heretofore in operation involved over-filling the mold and taking off the excess in order to fill the mold at the proper controlled pressure without undesired compaction. However, this requires handling of the excess material.

It will be appreciated that minor variations of density can cause a serious problem in the food industry because it is absolutely essential that the proper weight of material is provided to the customer and shortages must be positively avoided. On the other hand, if shortages are avoided by providing excess quantities, it is necessary to provide excess in the amount of the maximum deviation of the machine and this leads to considerable loss to the supplier who must bear the cost of this excess himself.

Automated handling of ground food products such as ground meat is particularly difficult, because these products are readily compacted under pressure to provide varying densities. However, automated handling is advantageous in reducing the cost of processing such material.

For these reasons, I have designed the present system which is particularly suitable for machines that make shaped food articles such as is disclosed in my United States Patent No. 3,213,486, entitled, "Molding Machines" dated Oct. 26, 1965. The former machine has been especially designed to form hamburger patties or the like from a supply line which is capable of providing an intermittent supply at a constant pressure in a regular fashion, and the latter application is suitable for providing mock chicken legs and the supply of meat required is quite similar in both applications. Although the invention is particularly directed for use in the machines cited above, it will be appreciated that the machine of the present invention has other applications such as in the packaging of oleomargarine or even possible for molding general plastic articles of thermoplastics or the like.

Accordingly, it is the primary object of this invention to provide a system for pumping the plastic mass to supply the same at a constant average pressure of minor variation in regular intermittent deliveries in which the supply pressure is positively maintained at all times at a selected controlled constant value to provide an intermittent supply of meat at a controlled constant density.

Another object of the invention is to provide a system of the character described in which plastic material is provided in a supply line from a continuous supply source by a pump or equivalent means and the supply line contains means associated therewith for converting the continuous supply to an intermittent supply in regular fashion with control means for controlling the rates of continuous supply in accordance with the demands of the system so as to positively assure that the material available for intermittent supply is at all times maintained between the maximum and minimum amounts necessary for accurate speedy operation.

A further object of the invention is to provide a system for supplying plastic material of the character described, in which the control of the original supply is of an electrical nature that is immediately responsive to changes in demand and is not subject to wear of moving parts.

Still another object of the invention is to provide a supply system of the character described in which the pressure of plastic material in the supply system is maintained at a selected constant pressure at all times and in which means are provided for altering the selection of constant pressure as desired.

A still further object of the invention is to provide a supply system of the character described in which the operation thereof is extremely rapid and efficient, and in which the possibility of breakdown is minimized or completely eliminated.

Further objects and advantages of my invention will appear as the specification continues, and the new and useful features of my system for providing an intermittent supply of flowable material will be fully defined in the claims attached hereto.

In accordance with the invention, a continuous supply of flowable material is controlled to provide an accurate output on demand. In the operation of a preferred form of the invention, the continuous supply is converted into an intermittent supply thereof by utilizing a variable volume reservoir which is maintained at a substantially constant pressure. This constant pressure is preferably maintained by backing up a movable wall in the reservoir with a pneumatic chamber containing air or gas at a controlled pressure.

In each embodiment of the invention it is significant to note that a shaft position signal is derived from a movement of a rod carried by the movable wall or piston element and without resort to any physical contacting of the rod. This is achieved electrically without sliding or wiping contacts or hydraulic lines which inevitably foul the comestible or other plastic or liquid material. Therefore, it may be appreciated that the invention herein is not a machine speed control or governor but rather a pump control of the automatic type in which the speed of the handling or forming machine may be under automatic control or be manually adjusted and the pump automatically follows along to provide the requisite demand. In this connection, the exact techniques for motor speed control of the pump motor are set forth with a new degree of accuracy in the supply of intermittant demand because of the practically zero restraining forces in the electrical translating arrangement.

In one form of the invention separate spaced-apart windings or coils influence separate bridge circuits which, in turn, have their outputs differentially combined to control thru a phase shifting circuit, the firing of an SCR which regulates the armature supply voltage for the pump motor.

In another form of the invention a single differential transformer is similarly employed to develop signals proportional to displacement of the piston rod which signals are rectified, averaged and compared with a voltage derived from the armature whereby the differential voltage controls the firing of an SCR bridge, rectifier, in turn supplying armature voltage.

A similar and preferred arrangement employs a pair of differential transformers wherein one transformer has a fixed armature to serve as a zero-adjustment reference whereby the voltage range output is effectively doubled in developing the translating signal. Also, in this latter arrangement, a bridge rectifier converts the AC signal to a DC pulsating output which is supplied to an RC averaging network which also receives a predetermined portion of the armature voltage. The RC network enables a signal related to average position of the rod rather than instantaneous position which signal actually constitutes a differential between the input from the translating device and the armature voltage. The differential voltage is amplified and again utilized to control an SCR bridge for varying the applied armature voltage to effect speed control of the pump motor.

The embodiments of my invention are illustrated in the accompanying drawing forming a part of this description in which:

FIGURE 2, is a diagrammatic view of an automatic control system that may be used in the practice of this invention.

FIGURE 3 is a schematic arrangement of a further embodiment of the invention employing a slightly different technique and, FIGURE 4 is a schematic arrangement of a preferred embodiment of the invention.

Figure 1:
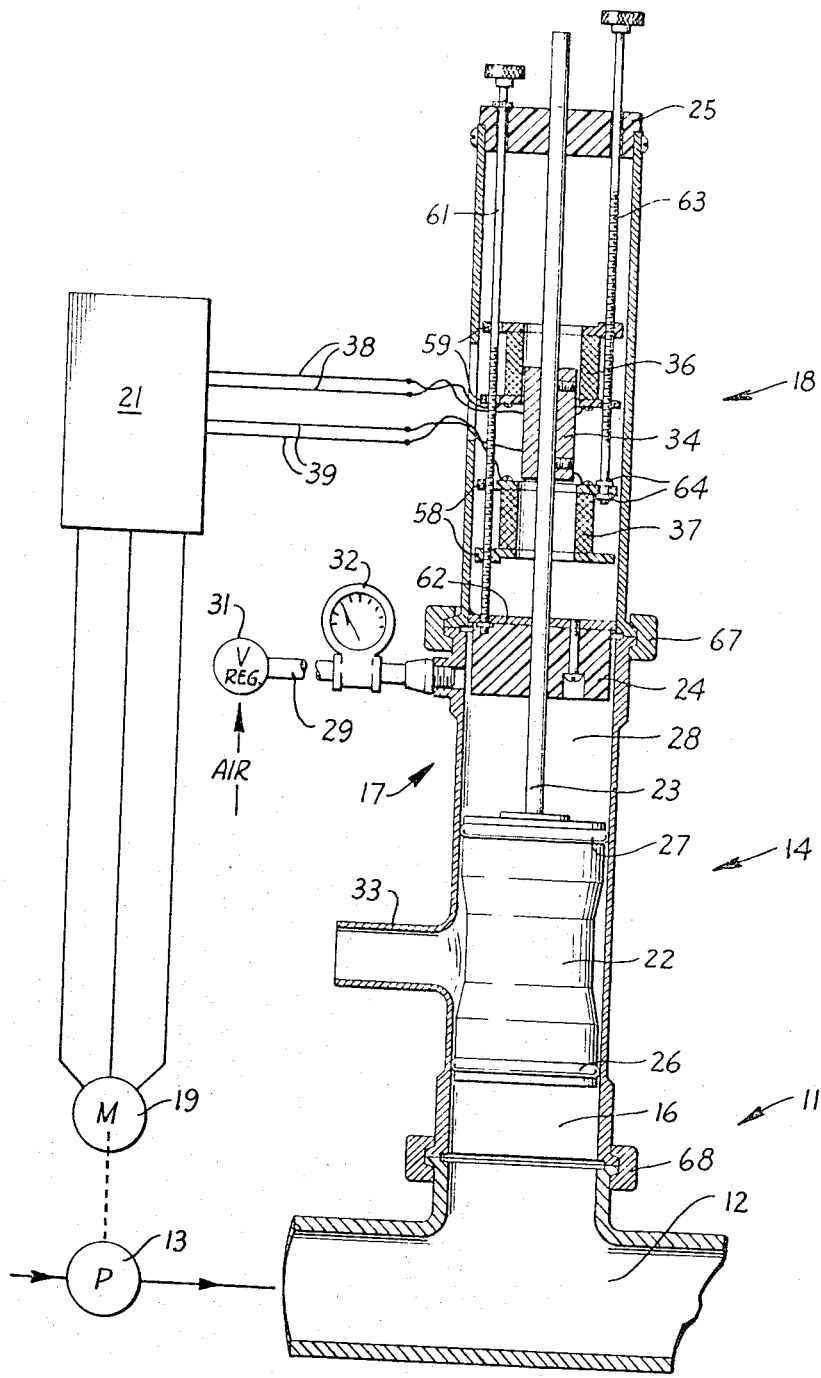
FIGURE 1 is an elevational view, partly in section and partly in schematic, illustrating a preferred form of this invention.

Referring to the drawings in greater detail, there is shown a supply system 11 for providing an intermittent supply of flowable material such as ground meat from a continuous supply thereof in a supply line 12 while maintaining the pressure in the supply line at an adjustable constant value. As shown schematically in FIGURE 1, the material is generally supplied continuously in line 12 by means of a pump 13 or equivalent system. In other words, the supply may be provided by a continuous acting pump as shown or by means of a control valve operating on a supply line by which a pump or other pressure means is provided behind the valve to maintain sufficient pressure in supply line 12 so that the pressure control means utilized in this invention may maintain the pressure constant.

The supply system 11 also comprises an indexing element 14 operatively connected to the plastic mass in supply line 12 having a variable chamber or reservoir 16 formed for displacement in accordance with the volume of said mass provided in the supply line differing from the demand at a particular time, means 17 connected to said indexing element formed for resisting said displacement with a predetermined counterpressure, and sensing means 18 associated with indexing element 14 and responsive to changes in the position thereof. The sensing means 18 is operatively connected to a motor 19 through a control circuit 21 which is capable of varying the motor speed in accordance with the position of the indexing element so that the rate of supply may be varied according to variations in the indexing element.

The indexing element 14 provides a variable reservoir 16 so that during the period of intermittent supply when no plastic material is taken from the supply line 12, the plastic material enlarges the variable reservoir 16 and moves into it. Then plastic material is available from the chamber during the period of maximum supply. In this way, the pump may deliver a substantially constant supply of plastic material into supply line 12 but the flow of material from the supply line 12 will be intermittent with say one-half the period delivering no plastic material at all and the other half of the period delivering at twice the rate delivered by the pump. Basically, the indexing element comprises a piston or plunger 22 carried on the end of a rod 23 which is journaled for axial movement in Teflon blocks 24 and 25. At the lower end of the piston 22 an O-ring 26 is provided to seal the chamber 16 and confine the plastic material at the lower end of the piston. Another O-ring 27 is located at the upper end of the piston so as to provide a chamber 28 between the upper end of the piston and the lower Teflon block 24.

Pressure is maintained at a controlled value within chamber 28 by conventional means such as a compressed air supply (not shown) communicating to the chamber through line 29, which line contains pressure regulator 31 and gauge 32. Chamber 28 is kept sealed at all times so that the air pressure is maintained therein to constantly resist the meat pressure in the supply line 12. In order to minimize pressure changes in the chamber 28 due to changes in its volume, a large part of the chamber is not reduced by the piston and the line 29 is also large. If desired, an additional air chamber can be provided in line 29.

The pressure regulator 31 also contains a bleed-out mechanism to limit the rise of pressure above the value set on the device. In this way, a controlled average constant pressure is obtained with minimal deviation due to movement of the plunger.

In the event that the supply of meat taken from the supply line 12 is cut off for an undue length of time, the piston 22 is forced upward until the meat communicates with an overflow 33 to pass therefrom. In this way, no damage is done as a result of such a stoppage and the meat or other plastic material may be easily recovered from the overflow pipe. In order to accommodate this overflow, the piston 22 is made elongated as shown so as to allow a full length of stroke without having the upper seal pass the overflow and lose the compressed air supply in chamber 28.

In general, the sensing means 18 may be any device capable of transmitting the position of rod 23 in regard to the area of reciprocation to a control for the pump or valve or whatever means is provided for controlling the rate of continuous flow in pipe 12. In general, these means will be an inductive type transducer capable of translating the mechanical position into an electrical signal which in turn may be utilized to operate the control of supply in line 12. In other words, in the embodiment shown the transducer will control the speed of motor 19 and thereby control the speed of pump 13 so that the rate of supply in the continuous supply line of flowable material is regulated to maintain the reciprocating movement of the indexing element centered around a neutral position.

Since the rod 23 undergoes a reciprocating motion, there would ideally be a neutral area of reciprocation where no change in the operation of the pump should be effected. If the position of reciprocation changes by virtue of a variable chamber 16 containing too much meat, rod 23 will reciprocate in an area which is too high as shown in the illustration and the control circuit will slow the motor down. Conversely, when the supply of meat or other plastic material in chamber 16 becomes too low the area of reciprocation of rod 23 is lowered so as to activate the sensing means and speed up the pump. In the embodiment shown, the area of reciprocation tends to kick from one extreme to the other, and although this provides a strain on the electrical elements to the motor it is quite satisfactory in operation. However, pulse averaging RC networks can be incorporated across the outputs of amplifiers 46 and 47 to respond to the average position of the iron core 34 (and the indexing element) to provide a constant DC voltage on the SCR firing circuit instead of a pulsating voltage. This transducer problem has also been faced by other inventors, and various transducer elements capable of operating a motor as desired are available on the market.

However, in order to illustrate an operative system developed by the inventor, a typical system that may be used is shown in the drawings. In this system, the rod 23 carries an iron core 34 which reciprocates along with the rod 23. At the upper and lower end of the stroke of core 34, there are located impedance windings or coils 36 and 37 respectively. Thus when an alternating current is provided in coils 36 and 37 the reactance thereof is varied by the position of the iron core 34. In this way, the current flow through lead wires 38 to coil 36 and the current flow through lead wires 39 to coil 37 are influenced or responsive to the position of the iron core of the indexing element. As best seen in FIGURE 2, the impedance coils 36 and 37 are made part of a bridge circuit contained within the box 21 with the source of electricity for the bridge being preferably a high frequency alternating current such as the 400-cycle current source 41 shown. By utilizing a compartively high cycle source, the sensitivity of the coils is increased and smaller coil systems may be used with good results.

Referring again to FIGURE 2, it is seen that the bridge circuit is completed with variable resistances 42 and 43 on the bridge legs of the coils 36 and 37, respectively. These variable resistors may be adjusted to provide the zero balance for the system. On the other side of the bridge legs, fixed resistances 44 are provided to complete the bridges. Thus it is seen that when the iron core is in a neutral position the impedance coils 36 and 37 are the same and the bridges are balanced so that no current flows from the output of the bridge containing coils 36 which leads to amplifier 46. Similarly, there is no current flow from the bridge containing coil 37 which leads to amplifier 47. However, when there is a change of position a signal will be received in either amplifier 46 or amplifier 47 as the case may be, and current will flow from either the output lines 48 of amplifier 46 or output lines 49 of amplifier 47. The output of the amplifiers is adapted to adjust a speed control circuit of the direct current motor 19 which has its speed regulated through variations in the armature supply voltage.

Such motor controls are available commercially and the motor control illustrated herein as block 53 is the Model 430 Motor Control of ACF Electronics Division, Paramus, N.J. This control operates by virtue of a signal taken from a group of resistances in parallel to the armature which carries a voltage corresponding to the IR drop of the motor and serves as a sensing leg which is balanced by a controlled reference voltage. Any change in the speed stabilizing circuit 53 is then sensed by a magnetic amplifier circuit by comparison to a Zener controlled constant potential ref. source (indicated by square marked "SCR Firing Control Circuit" of ACF Model 430 control) which in turn regulates firing angle of SCR and the output voltage to the pump motor armature 19.

As shown in FIGURE 2, the signals from amplifiers 46 and 47 provide either a buck or a boost to the EMF in leg 53 and thereby operate through the adjusting mechanism to provide a buck or a boost to the IR drop across the motor 19. This causes a speedup or slowdown, depending on the voltage applied to the sensing leg. In this way, the position of the core 34 is sensed by coils 36 and 37 and translated into a signal which effects a control on the speed of the motor. As indicated above, any number of circuits could be designed to provide this function and the illustration given in FIGURE 2 is simply provided for the sake of illustrating one manner in which the invention may be carried out. Accordingly, the invention should not be limited to any particular circuitry.

Referring again to the operation of the supply system, it is seen that the outlet to supply line 12 may be completely closed for successive intermittent periods and yet the pump 13 may be operated in a substantially continuous manner. This is achieved by virtue of variable chamber 16 operating to take up the meat supplied by the pump during this shutoff period and providing same into the system when the supply line 12 is opened. In addition, the pressure control of variable chamber 16 is important in order to prevent undue compressing of the meat or plastic material so as to seriously alter the density thereof. In other words, the control provides uniform operating conditions so that meat or the like may be delivered to a mold or other forming unit with a substantially constant degree of compactness and therefore obtain uniform weights of molded articles for the fixed volume of the mold.

The pressure in the chamber 16 is essentially constant within close limits, as an extremely small effort is required to move the inductive coupled transducer. This makes it an excellent pump control for any material or liquid in which constant pressure at the delivery to a machine within close limits is required.

Since the density characteristics of meat or other material being utilized may vary somewhat from time to time, it is important to provide means for regulating the air pressure in chamber 28 so that these variations may be corrected by changes in compaction as various supplies are provided to the machine. It is also necessary or desirable to alter the amount of meat supplied during each intermittent supply period in order to compensate for various sizes of molds and these changes are effected by a change in stroke of the plunger 22. Accordingly, it is also desirable to change the locations of or distances between coils 36 and 37 in order to provide the optimum placement for various lengths of stroke.

In general, any suitable means for adjusting the position of coils 36 and 37 may be utilized. As shown in FIGURE 1, each coil is supported between a pair of rings fitting within the cylinder of the sensing means. Thus coil 37 is carried between rings 58 while coil 36 is carried within rings 59, and the verticle position of coil 37 is adjusted by the rotation of bolt 61 threaded through one or both rings 58. Bolt 61 is journaled into a ring 62 on which Teflon block 24 is attached and also journaled through Teflon block 25. Another bolt 63 is utilized to adjust the relative distance of rings 58 and 59 and thereby adjust the distance between coils 37 and 38. As here shown, bolt 63 is journaled through rings 58 and held against axial movement by collars 64 while being threaded through rings 59. Thus rotation of bolt 63 effects a change in the distance between coils.

Another feature of the invention is the construction of the supply system in sections so that the unit carrying the meat may be easily disassembled from the sensing means section by removal of coupling 67. This allows disassembly of the unit for easy cleaning of the meat section after usage thereof. A coupling 68 is also provided for easy attachment of the supply system to the supply line 12.

In FIG. 3 there is shown an alternative type approach to motor speed control, as used in connection with the monitoring of the flowable material in the variable chamber arrangement. In this schematic showing, a differential transformer 101 replaces the spaced-apart coils 36 and 37, but is otherwise influenced by reciprocating motion of plunger 103 carried by piston 105 in the variable chamber 107 which is in communication with the flow pipe 109. Physically, the armature is carried by shaft 103 corresponding to shaft 23 of FIG. 1 and the differential connected windings 117 and 119 replace the spaced-apart coils 36 and 37.

For best results, the power supply source is provided with 110-volt, 60-cycle from A.C. mains 111 by way of oscillator 113 which supplies, preferably about 1500-cycle current to the primary 115 of differential transformer 101. The secondary differential coils 117 and 119 feed the rod or shaft position signal through amplifier 121 which includes a potentiometer type zero-reference adjustment 123.

It should be pointed out that zero-reference potentiometer 123 may be replaced by a second differential transformer, as will be described in connection with the next embodiment.

The output signal from amplifier 121 is fed to an AC to DC conversion circuit 125 which may comprise a bridge type rectifier.

The converted shaft position signal is next stored in a conventional RC network or the like 127, and a portion of this signal applied by potentiometer to a comparison circuit 131. The DC signal voltage is compared with a predetermined portion of the armature voltage which is derived from potentiometer 135 connected in parallel with armature 137. This reference portion of BEMF or DC armature voltage is filtered at 139 before it is introduced to the comparison circuit 131. Since the motor speed is directly proportional to the armature voltage, the difference voltage, if any, from comparison circuit 131 is used as the triggering input to the SCR firing control circuit 141. Circuit 141 may comprise a commercially available circuit, such as Unitrigger 505B available from Empire Services Division, of Diversified Concepts, Inc., Skaneateles, N.Y.

Circuit 141 simply controls the firing points of SCR's 143 and 145 connected in the bridge circuit 147 which is supplied from transformer 149 by 220-volt 60-cycle AC main 150. The DC full wave output of bridge circuit 147 directly supplies voltage to armature 137 and, consequently altering the firing angle of SCR's 143 and 145 produces a proportionate speed change in the pump motor.

The field 151 for armature 127 is supplied from the same AC source 150 over secondary winding 153 and by way of full wave bridge 155 with potentiometer 157 being provided to adjust the field current.

The advantages of the circuit of FIG. 3 are obtained from the use of the single differential transformer which permits the employment of commercially available components and provides a more constant armature voltage.

Figure 4:
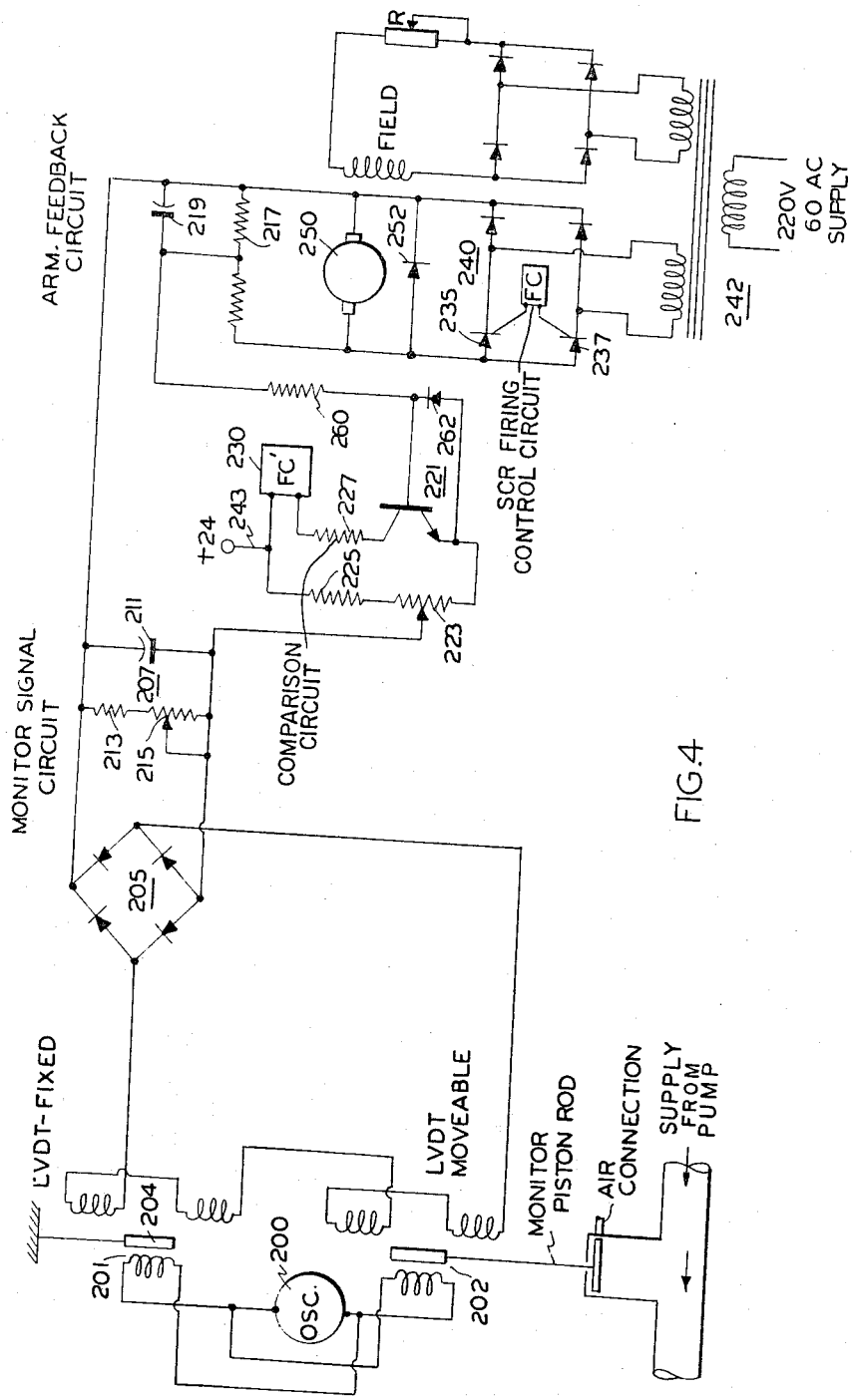

The preferred embodiment of the invention is schematically illustrated in FIG. 4 and is shown as employing a pair of differential transformers 201 and 202 for producing the floating piston shaft position signal. The input power is derived from a 1500-cycle oscillator source 200. The armature 204 of transformer 201 is fixed and this transformer is used to establish the zero reference point. Thus, instead of the piston shaft starting at mid-range as it would be if with only a single differential transformer, without any doubling means the use of a pair of transformers effectively doubles the total range by starting the zero point at any extremity of the stroke instead of in the middle of the stroke. In other words, when the piston is all the way up, a zero voltage output shaft position signal is derived and when the piston is all the way down, a maximum shaft position signal is produced.

The signal derived from the pair of differential transformers 201 and 202 is in direct relationship to the ratio of displacement to voltage, as obtained over the 2″ stroke of the floating piston shaft in the monitor unit. This signal is applied as the DC pulsating output signal.

A feature of the invention resides in the RC network 207 connected across the output of the bridge 205.

This network includes, for example a fixed 100-mfd. capacitor 211 connected in parallel with a fixed 15,000-ohm resistor 213 and an adjustable potentiometer 215 which may include from zero to 35,000 ohms of resistance. The potentiometer 215 is physically located on the same shaft as the speed control potentiometer of the machine the pump unit is supplying, if such control is available, or can be manually adjusted for the most usual operating speed of the machine the pump unit is supplying. Thus the resistance of the network is adjusted for machine speed so that the RC circuit will store the pulses for the duration of each demand pulse within reasonable accuracy. Too little storage (low RC) will result in a ripple in the voltage output supplied to the SCR firing control and a resultant ripple in DC voltage to the pump motor armature. Too high a value of RC will cause the control to be sluggish in its response to pressure changes (reflected by differential transformer armature displacements) in the monitor and hunting. The RC network should effectively act to just store, and not overstore, the pulses for an average value regardless of machine speed (pulse frequency) and thereby enhance the control action. Thus the RC value of the network should approximately match the machine speed. In other words, whenever the machine speed (pulse frequency) changes, the ripple factor would change and this is compensated for by adjustment of the potentiometer 215 either by an approximate setting manually or by attaching it mechanically to the machine (that which the pump is supplying) speed control potentiometer shaft when possible.

The signal voltage which appears across the RC network from bridge rectifier 205 has a plus value on the upper terminal. The feed back voltage from the motor armature derived across resistor 217 and filtered by capacitor 219 has a plus voltage at the right hand end of resistor 217. Therefore any difference voltage between the selected portion of the BEMF and the DC signal from the RC network 207 appears across transistor amplifier 221.

In this circuit a small voltage feedback loop is established by trim potentiometer 223, adjustable up to 200 ohms to correct for average position of the center of the 2″ range of the monitoring shaft. This branch of the circuit also includes a 3300-ohm fixed resistor 225, as distinguished from the limit resistor 227 of 10,000 ohms.

The amplified difference voltage appears at the unit FC′ (block 230) which along with the firing control FC (block 232) constitutes the same commercially available SCR firing control circuit as described at 141 connection with FIG. 3. Both firing control blocks 230 and 232 are actually contained in the same case and are supplied as a plug-in module as identified. The only difference is that the block 232 (FC) furnishes the pulses or firing pips to the SCR's 235 and 237 of full wave bridge 240 to control the exact firing point in the cycle of the 230-volt AC input applied to transformer 242, whereas the FC′ block 230 is the DC current input portion of the circuitry (connected to the plus 24-volt supply 243) which actually changes the phase relationship of the pips with respect to the line voltage.

Therefore, it may be observed that the block 230 (FC′) actually produces the firing control applied by block 233 (FC) to SCR's 235 and 237 to increase or decrease the effective armature voltage applied to DC pump motor armature 250.

A conventional filter diode 252 is employed in parallel with armature 250.

As the current input to block 230 (FC′) from transistor amplifier 221 is increased, the firing pips move further to the left in the AC supply voltage increasing the DC voltage applied to armature 250 to increase the output voltage.

The output or feedback voltage path also includes the 47,000-ohm protective resistor 260 and the by-pass diode 26. This diode, connected around the emitter-base electrode of the transistor 221, permits bypassing of the RC timing during any decrease in speed and thus the transistor 221 is unaffected. On the other hand, no protective diode is required in the emitter-base circuit because of low voltages otherwise obtaining.

The reason that the last described embodiment is the preferred form of the invention is because of the use of a pair of differential transformers which simply effectively and accurately doubles the range to provide a greater output voltage per unit displacement. Moreover, the differential transformers permit the employment of commercially available components and enable a more constant armature voltage. Lastly, the RC network provides greater accuracy through the provision of an average value for the pulsating signals which depicts average shaft position rather than instantaneous shaft position.

It should be mentioned that a single differential transformer could supply the signal along with a potentiometer connected between primary and secondary in an arrangement for shifting or adjusting of zero-reference point to one extreme of travel. Thus the second differential transformer with a fixed armature, normally used for this purpose could be eliminated with a saving in cost.

It may now be appreciated that, both circuits of FIGS. 3 and 4 are generally the same system except that in FIG. 3 the second fixed armature differential transformer can be eliminated and a potentiometer substituted therefor. This will essentially perform the same function as the second differential transformer in bringing the zero point to one extremity of the stroke and the maximum point to the other extremity of the stroke. The linearity is not quite as good due to harmonics present but for the purposes for many type controls as here, it will not matter at all. It is less expensive this way. Also in the FIG. 3 circuit, an amplifier is included right after the differential transformer to increase the signal strength to a more positive value. Also the use of a voltage divider on the output of the pulse averaging network or filter, enables a load matching so that any portion of the output of the monitoring signal desired may be used. In this way, the maximum speed of the pump can be matched to the maximum demand of the machine it is driving. This potentiometer is set and left permanently in that setting unless the pump is moved to another machine of a different demand rate, in which case it is reset for the new machine.

From the foregoing description, it is seen that I have provided a supply system capable of changing a substantially continuous supply of ground meat or the like to a regular intermittent supply thereof while at the same time maintaining a controlled pressure in the supply line in order to achieve feedings of substantially constant density material to mold units or the like. In addition, it is seen that my pump system automatically compensates for the effect of variations in fibrosity or viscosity of the meat on the pump.

It should be understood that the pump control has application to any problem involving constant pressure and any flow from constant to intermittent and/or varying demand.

Any plastic material or liquid and any type of pump which varies its pressure with change in speed such as gear, lobe, moving cavity, reciprocating piston, diaphragm, centrifugal, etc., may be employed as a controlled device in accordance with the principles herein set forth. The control actually operates to smooth out surging supplies from a pump as, for example, with lobe pumps at certain speeds as is also the case with reciprocating pumps and others which are identified as intermittent or varying delivery type pumps. The control causes the pump output to be delivered to a constant or pulsating demand but at a constant pressure. Thus, it is desired that the invention be treated in its broadest aspects as is set forth in the scope of the appended claims wherein:

I claim:
1. A speed control system for a motor having an armature comprising voltage supply regulating means for the armature; indexing means displaceable in accordance with required speed increases and decreases; means responsive to the position of the indexing means for developing an electrical speed control signal; said responsive means comprising means for amplifying the control signal and establishing a zero reference therefor; means for converting the amplified signal to a DC signal; an RC storage circuit for the converted signal; means responsive to a portion of the applied armature voltage to provide a feedback signal; means for comparing the amplified and stored control signal and the feed-back signal to develop a difference signal; and means for controlling the voltage regulating means by said difference signal.

2. The apparatus of claim 1 wherein the means responsive to the position of the indexing means comprises a differential transformer; and an oscillator for supplying voltage to the differential transformer.

3. The apparatus of claim 2 wherein the voltage supply regulating means for the armature comprises silicon controlled rectifiers and the difference signal controls the firing thereof.

4. A speed control system for a motor having an armature comprising voltage supply regulating means for the armature; indexing means displaceable in accordance with required speed increases and decreases; means responsive to the position of the indexing means for developing an electrical speed control signal; said responsive means comprising a pair of differential transformers connected to develop the control signal relative to a zero reference; bridge means for converting the control signal to DC; means responsive to a predetermined portion of the armature voltage to develop a feed-back signal; an RC network for averaging the DC signal; means for comparing the average DC signal and the feedback signal to derive any difference voltage therebetween; and means for controlling the voltage regulating means by said difference voltage.

5. The apparatus of claim 4 wherein the voltage supply regulating means for the armature comprises silicon controlled rectifiers and the difference signal controls the firing thereof.

References Cited
UNITED STATES PATENTS

| | | | |
|---|---|---|---|
| 1,615,643 | 1/1927 | Mickey | 103—35 |
| 2,329,287 | 9/1943 | Miller | 103—35 |
| 2,329,288 | 9/1943 | Miller | 103—35 |
| 2,747,224 | 5/1956 | Koch | 103—35 |

ROBERT M. WALKER, *Primary Examiner.*
LAURENCE V. EFNER, *Examiner.*